United States Patent
Suzuki et al.

[11] Patent Number: 5,408,311
[45] Date of Patent: Apr. 18, 1995

[54] METHOD FOR MEASURING A REFRACTING POWER OF AN OPTICAL SYSTEM AND ITS APPARATUS

[75] Inventors: Toshiyuki Suzuki; Yoshinobu Ogawa; Kazuhito Miyajima, all of Nagoya, Japan

[73] Assignee: Tomey Corp., Nagoya, Japan

[21] Appl. No.: 292,741

[22] Filed: Aug. 19, 1994

Related U.S. Application Data

[63] Continuation of Ser. No. 20,975, Feb. 22, 1993, abandoned.

[30] Foreign Application Priority Data

Feb. 25, 1992 [JP] Japan .................. 4-073352

[51] Int. Cl.⁶ .................. G01B 11/00; G01B 11/08
[52] U.S. Cl. .................. 356/124; 356/127; 250/233
[58] Field of Search .......... 356/124, 124.5, 125, 356/126, 127, 121; 250/233

[56] References Cited

U.S. PATENT DOCUMENTS

| | | | |
|---|---|---|---|
| 3,761,179 | 9/1973 | Plummer et al. | 356/124 |
| 4,182,572 | 1/1980 | Humphrey | 356/127 |
| 4,199,816 | 4/1980 | Humphrey | 356/127 |
| 4,730,116 | 3/1988 | Ida et al. | 250/560 |
| 4,973,153 | 11/1990 | Yokokura et al. | 356/4.5 |
| 5,148,231 | 9/1992 | Ishiguro et al. | 356/126 |
| 5,267,012 | 11/1993 | Sasnett et al. | 356/121 |

FOREIGN PATENT DOCUMENTS

| | | |
|---|---|---|
| 0059480 | 9/1982 | European Pat. Off. |
| 0469287 | 2/1992 | European Pat. Off. |
| 3007125 | 11/1980 | Germany |
| 0280543 | 12/1986 | Japan |
| 0280544 | 12/1986 | Japan |
| 0046130 | 2/1988 | Japan |

Primary Examiner—Rolf Hille
Assistant Examiner—Alexander Oscar Williams
Attorney, Agent, or Firm—Oblon, Spivak, McClelland, Maier & Neustadt

[57] ABSTRACT

A method and apparatus for measuring a refracting power of an optical system to be inspected. A beam source generates a luminous flux which passes through the optical system to be inspected. A rotating plate intermittently blocks the beam after passing through the optical system to be inspected. A beam receiving element receives the beam passing through the optical system to be inspected and intermittently blocked by the rotating plate, and outputs a beam reception signal based on the received beam. A rotational position detector detects a rotational position of the rotating plate and outputs a rotational plate detection signal based on the detected rotational position of the rotating plate. Further, a calculating means calculates the refracting power of the optical system to be inspected based on a change quantity from the detected rotational plate detection signal to the detected beam reception signal.

12 Claims, 8 Drawing Sheets

METHOD FOR MEASURING A REFRACTING POWER OF AN OPTICAL SYSTEM AND ITS APPARATUS

This application is a Continuation of application Ser. No. 08/020,975, filed on Feb. 22, 1993, now abandoned.

BACKGROUND OF THE INVENTION

1. Field of the Invention

The present invention relates to a method for measuring a refracting power of an optical system such as lenses for glasses and a contact lens, and its apparatus, particularly to a method for measuring a refracting power of an optical system and its apparatus having a basic principle of retinoscopy, capable of easily measuring a refracting power of an optical system with high accuracy.

2. Discussion of the Background

Conventionally, as shown in Japanese Unexamined Patent Publication No. 280544/1986, Japanese Unexamined Patent Publication No. 46130/1988 and the like, a kind of an apparatus for measuring refracting powers in various optical systems such as in a lens for correcting abnormality of refraction of an eye and lenses for optical instruments, is known which is provided with the basic principle of retinoscopy, wherein the refracting power of such an optical system to be inspected is measured by projecting a predetermined luminous flux to an optical system to be inspected and by detecting a beam transmitted through the optical system to be inspected by a beam receiving element for measurement, based on the moving direction, the velocity and the twist of the transmitted beam.

In the conventional apparatus for measuring a refracting power, to detect the moving direction, the velocity and the twist of the luminous flux transmitted through the optical system to be inspected by the beam receiving element for measurement, a rotating drum or a rotating plate provided with slits having at least two kinds of angles of inclination with respect to a rotational direction at its edge portion, is disposed on an optical path for intermittently blocking the luminous flux and photoelectric converting elements are disposed as the beam receiving elements for measurement at positions forming at least two pairs thereof, centering on an optical axis, and the refraction power of an optical system to be inspected is provided from a difference of phase in outputs of the respective paired photoelectric converting elements.

However, in the apparatus for measuring refracting power having such a construction, it is necessary that the angles of inclination at the edge portion of the slit provided on the rotating drum or the rotating plate and the positions for providing the respective paired photoelectric converting elements provided at the beam receiving element for measurement correspond to each other, and they can not be determined independently. Therefore, there is no degree of freedom in design and the fabricating and adjusting thereof are difficult.

Furthermore, in using the rotating drum, since the surface of the drum is of a curved face, it is extremely difficult to make the edge portion of the slit substantially a straight line with respect to the rotational direction. In using the rotating plate, it is difficult to make constant the angle of inclination of the edge portion of the slit with respect to the rotational direction, in the radial direction. Therefore, it is extremely difficult to maintain the correspondent relationship between the positions for providing photoelectric converting elements at the beam receiving element for measurement and the angle of inclination with high accuracy, over the whole length of the edge portion wherein the position for intermittently blocking the luminous flux is changed in accordance with the refracting power of the optical system to be inspected. Accordingly, it is difficult to sufficiently provide the measurement accuracy.

Furthermore, in the apparatus for measuring a refracting power, the refracting power of the optical system to be inspected is provided from the phase difference of the outputs of the respective paired photoelectric converting elements, on a premise wherein a moving velocity of the luminous flux intermittently blocked by the slits, or a rotational speed of the rotating drum or the rotating plate is maintained constant. Actually, it is difficult to always maintain the rotational velocity of the rotating drum or the rotating plate as constant. A measurement error is apt to be caused by a nonuniformity of rotation.

SUMMARY OF THE INVENTION

It is an object of the present invention to provide a method for measuring a refracting power of an optical system and its device wherein it is not necessary to correspond an angle of inclination at an edge portion of a slit for intermittently blocking a luminous flux, to a position for providing photoelectric converting elements provided at a beam receiving element for measurement, degree of freedom in the design of device can preferably be provided, high measurement accuracy can easily be provided and correction with respect to a change of velocity of the slit intermittently blocking the luminous flux can easily be performed According to an aspect of this present invention, there is provided a method for measuring a refracting power of an optical system wherein a predetermined luminous flux is projected to an optical system to be inspected, the luminous flux transmitted through the optical system to be inspected is detected by a beam receiving element for measurement disposed at a position conjugate with the optical system to be inspected and a refracting power of the optical system to be inspected, is measured based on an output signal from the beam receiving element for measurement comprising the steps of:

projecting the luminous flux to the beam receiving element for measurement and intermittently blocking the luminous flux transmitted through the optical system to be inspected by rotating a rotating plate formed with at least two domains having different light transmittances partitioned by boundary lines having at least two kinds of angles of inclination with respect to a rotational direction around an axis on an optical path between the optical system to be inspected and the beam receiving element for measurement;

detecting the intermittent blocking of the luminous flux by the beam receiving element for measurement at least three beam receiving points;

detecting a rotational angle of the rotating plate in correspondence with a signal of measurement outputted from the beam receiving element for measurement by providing a position detecting means for detecting a rotational position of the rotating plate; and providing the refracting power of the optical system to be inspected based on a change quantity of the rotational angle of the rotating plate from a predetermined reference position.

According to another aspect of the present invention, there is provided an apparatus for measuring a refracting power of an optical system comprising:

a beam source disposed spaced apart from one side of an optical system to be inspected by a predetermined distance;

a first beam receiving element for measurement having at least three beam receiving points disposed spaced apart from the other side of the optical system to be inspected opposite to the beam source at a position conjugate with the optical system to be inspected and outputting a signal of measurement by detecting intermittent blocking of a beam projected to the respective three beam receiving points;

a beam projecting system for projecting a predetermined luminous flux to the optical system to be inspected;

a beam condensing system for condensing the luminous flux transmitted through the optical system to be inspected, in a predetermined domain;

an image forming optical system for leading the luminous flux transmitted through the condensing optical system, to the first beam receiving element for measurement;

a rotating plate rotatably disposed around an axis parallel to an optical path between the optical system to be inspected and the first beam receiving element for measurement, provided with at least two domains having different light transmittances partitioned by boundary lines having at least two kinds of angles of inclination with respect to a rotational direction and at least one slit for detecting a position around a rotating axis thereof, which is disposed on a plane orthogonal to the optical path between the optical system to be inspected and the first beam receiving element for measurement such that the boundary lines of the domains having different light transmittances move on the luminous flux transmitted through the optical system to be inspected;

a second beam receiving element for detecting a rotational position, outputting a rotational position signal of the rotating plate by detecting the intermittent blocking of a beam transmitted through the slit for detecting a position; and a treating system for detecting a rotational angle of the rotating plate based on the rotational position signal outputted from the second beam receiving element for detecting a rotational position and the signal of measurement outputted from the first beam receiving element for measurement and for calculating a refraction power of the optical system to be inspected based on a change quantity of the rotational angle of the rotating plate from a predetermined reference position.

DESCRIPTION OF THE PREFERRED EMBODIMENTS

A detailed explanation will be given of embodiments of the present invention to clarify the present invention more specifically in reference to the drawings, as follows.

Figure 1:
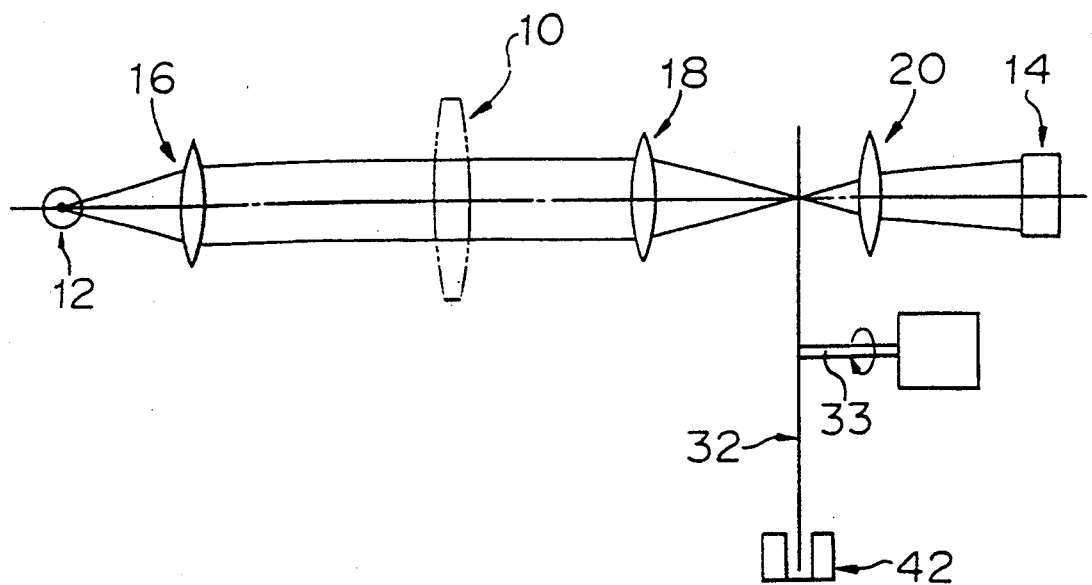
FIG. 1 is an outline construction diagram of an embodiment of an apparatus for measuring a refracting power according to the present invention.

First, FIG. 1 shows an outline construction diagram of an apparatus for measuring a refracting power having a construction in accordance with the present invention. In FIG. 1, a reference numeral 10 designates a lens to be inspected as an optical system to be inspected wherein a refracting power of the like is to be measured, wherein a beam source 12 is disposed on one side thereof and a beam receiving element for measurement 14 is disposed on the other side thereof, each of which is disposed spaced apart from the lens to be inspected by a predetermined distance. Furthermore, a beam emitted from the beam source 12 and transmitted through the lens to be inspected 10, can be detected by the beam receiving element for measurement 14.

More in details., the beam source 12 is composed of an infrared emission diode or the like. A projecting lens 16 as a projecting optical system is provided on an optical path between the beam source 12 and the lens to be inspected 10. The beam from the beam source 12 is transformed into an approximately parallel beam by the projecting lens 16, and is projected to the lens to be inspected 10.

A condensing lens 18 as a condensing optical system and an image forming lens 20 as an image forming optical system are provided on an optical path between the lens to be inspected 10 and the beam receiving element 14, spaced apart from each other by a predetermined distance. After the beam transmitted through the lens to be inspected 10 and condensed by the condensing lens 18, is led to a beam receiving face of the beam receiving element 14 by the image forming lens 20.

Accordingly, the beam receiving face of the beam receiving element 14 is conjugate with the lens to be inspected 10 by the condensing lens 18 and the image forming lens 20. A beam incident on a predetermined position of the lens to be inspected 10 is led to a predetermined position of the beam receiving face of the beam receiving element 14, irrespective of a refracting power of the lens to be inspected 10 or the like.

Figure 2:
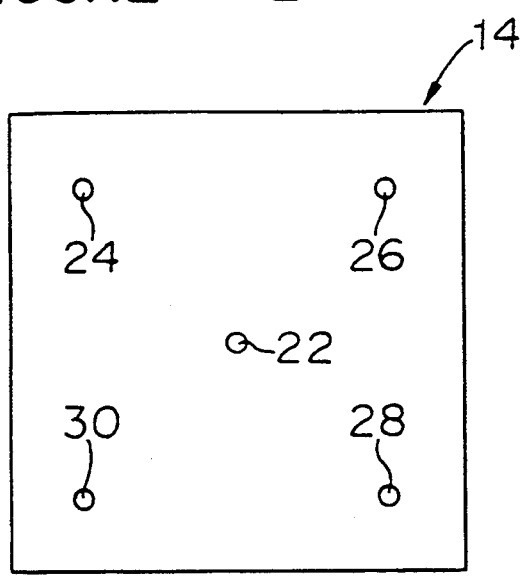
FIG. 2 is a front diagram of a beam receiving element employed in the apparatus for measuring a refracting power shown in FIG. 1.

The beam receiving element may be provided with three beam receiving points. In this embodiment, as shown in FIG. 2, the beam receiving element 14 is provided with a first photoelectric converting element 22 disposed on the optical axis and second, third, fourth and fifth photoelectric converting elements 24, 26, 28 and 30 around the first photoelectric converting element 22. Especially, in this embodiment, the second, the third, the fourth and the fifth photoelectric converting elements 24, 26, 28 and 30 are provided at the four corner portions of a square of which has a center at the first photoelectric converting element 22.

Therefore, in the apparatus for measuring a refracting power having the above construction, it may substantially be considered that the luminous fluxes are projected on the five points of the lens to be inspected 10 respectively corresponding to the positions for providing the first through the fifth photoelectric converting elements 22, 24, 26, 28 and 30 in the beam receiving element 14.

Furthermore, a rotating plate 32 is rotatably disposed around an axis 33 which is approximately parallel to the optical path, on the optical path of the apparatus for measuring a refracting power provided with the above optical system, situated between the condensing lens 18 and the image forming lens 20, on a plane orthogonal to the optical path.

Figure 3:
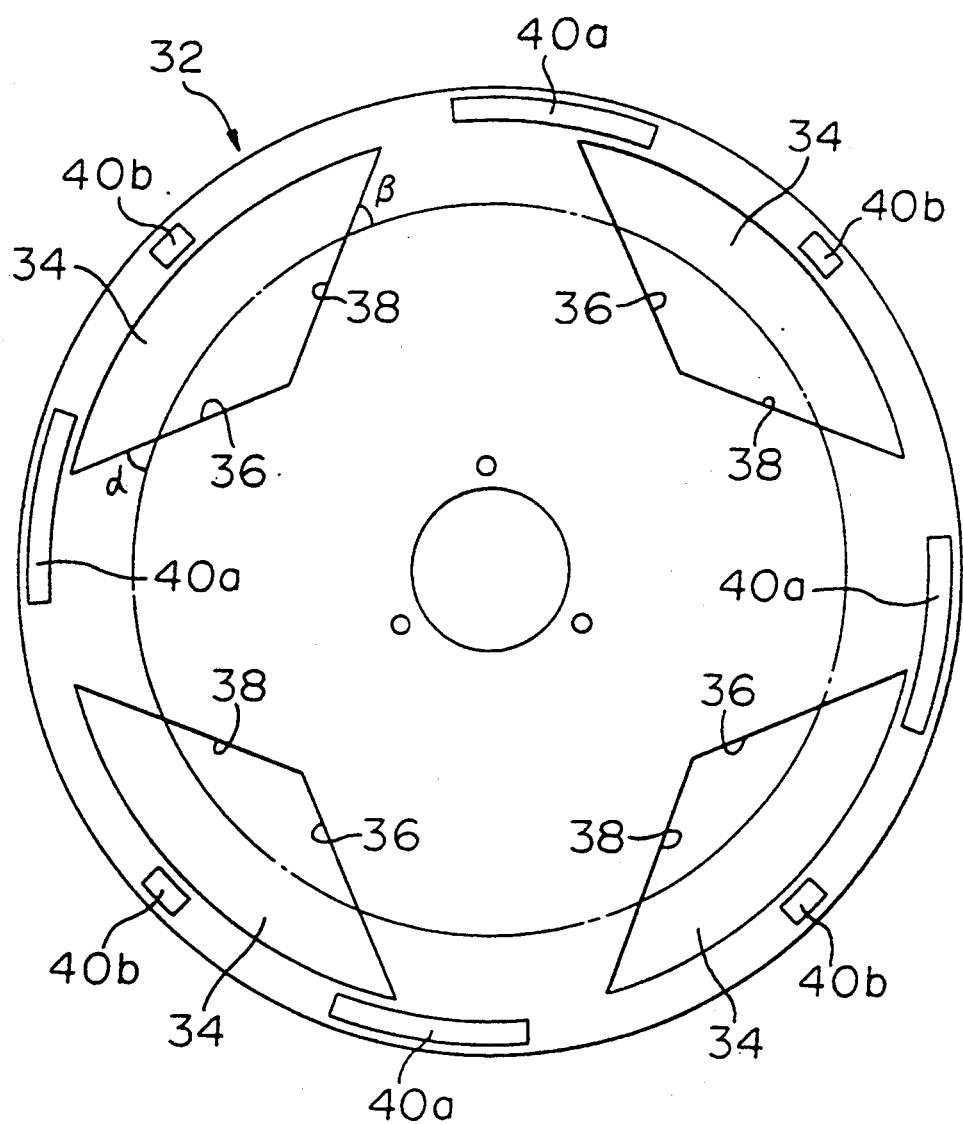
FIG. 3 is a front diagram of a rotating plate employed in the apparatus for measuring a refracting power shown in FIG. 1.

As shown in FIG. 3, the rotating plate 32 is of a disc-like shape as a whole. Windows 34 having an approximately fan-like shape are provided spaced apart from each other by an equal spacing in the peripheral direction, at positions spaced apart from each other by 90° in the peripheral direction. These windows 34 are arranged at positions intersecting the optical path.

The window 34 of the rotating plate 32 is provided with a front edge 36 disposed at the front portion of the rotating plate 32 in the rotational direction and a rear edge 38 disposed at the rear portion thereof in the rotational direction, each of which is of a linear shape. Furthermore, the shape of the respective window 34 is determined such that an intersection angle $\alpha$ made by the front edge 36 and a tangential line of a circle at an intersection point of the front edge 36 and an arbitrary circle with a center of rotation of the rotating plate 32 remains the same with respect to all the windows 34, and an intersection angle $\beta$ made by the rear edge 38 and a tangential line of a circle at an intersection portion of the rear edge 38 and an arbitrary circle with a center of rotation of the rotating plate 32, remains the same with respect to all the windows 34.

Furthermore, particularly in this embodiment, the intersection angles made by the front edge 36 and the rear edge 38, and the tangential lines of circles at the intersection points of the front edge 36 and the rear edge 38, and a circle on the rotating plate 32 as a locus of a center of the optical path, are determined to be provided with a relative difference angle of 90°, for instance, $\alpha = 45°$ $\beta = 45°$.

Figure 4:
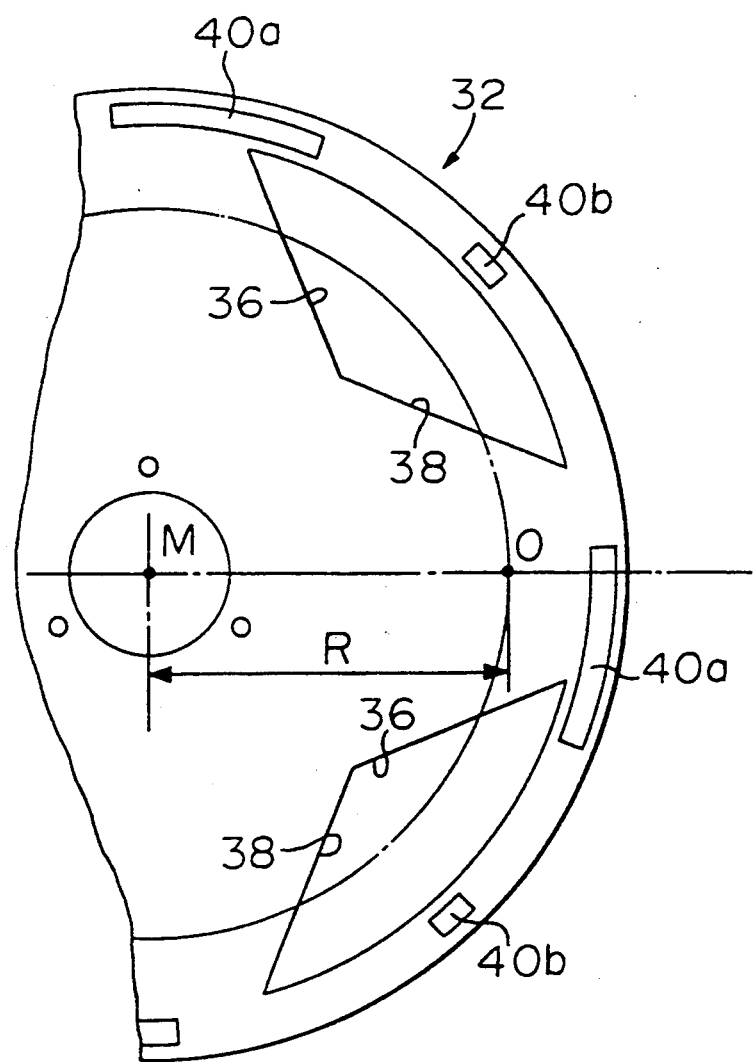
FIG. 4 is an explanatory diagram showing the positional relationship between a focus O on which luminous flux is condensed under a state wherein a lens to be inspected is not provided, and the rotating plate.

Furthermore, the rotating plate 32 is disposed at a position spaced apart from the condensing lens 18 by a focal length of the condensing lens 18 on the side of the image forming lens 20. Therefore, in a state wherein the lens to be inspected 10 is not provided, as shown in FIG. 4, the luminous flux is intermittently blocked by the rotating plate 32 on the focus O on which the luminous flux is condensed by the condensing lens 18. In FIG. 4, a notation M designates the center of rotation of the rotating plate 32, and R, a distance from the center of rotation of the rotating plate 32 to the center of the optical path.

Figure 5:
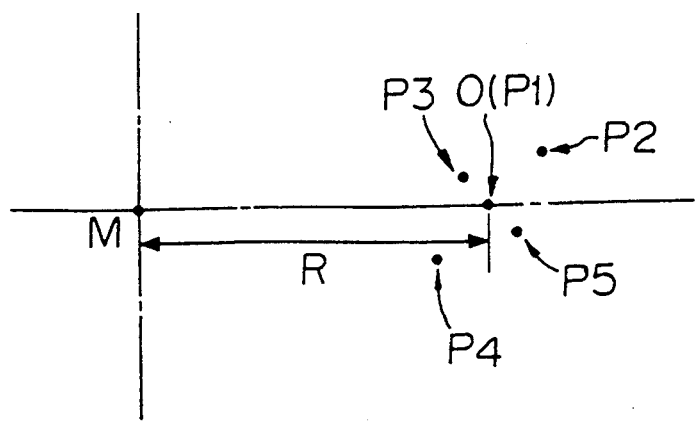
FIG. 5 is an explanatory diagram for showing an example of a state wherein the luminous flux on a plane orthogonal to an optical path including the focus O diverges when the lens to be inspected is provided.

Furthermore, when the lens to be inspected 10 having a certain refracting power is provided, in accordance with the refracting power of the lens to be inspected 10, the condensing point of the luminous flux on the optical path changes. Therefore, the luminous flux diverges on a plane orthogonal to the optical path including the focus O wherein the rotating plate 32 is provided. Considering only the beams projected on five points on the lens to be inspected 10 respectively corresponding to the positions wherein the first through the fifth photoelectric converting elements 22, 24, 26, 28 and 30 of the beam receiving element 14, as shown in FIG. 5 as an example, are provided, the beams projected to these five points diverge to the respective points of P1, P2, P3, P4 and P5 in accordance with the refracting power of the lens to be inspected 10, on the plane orthogonal to the optical path including the focus O.

Figure 6:
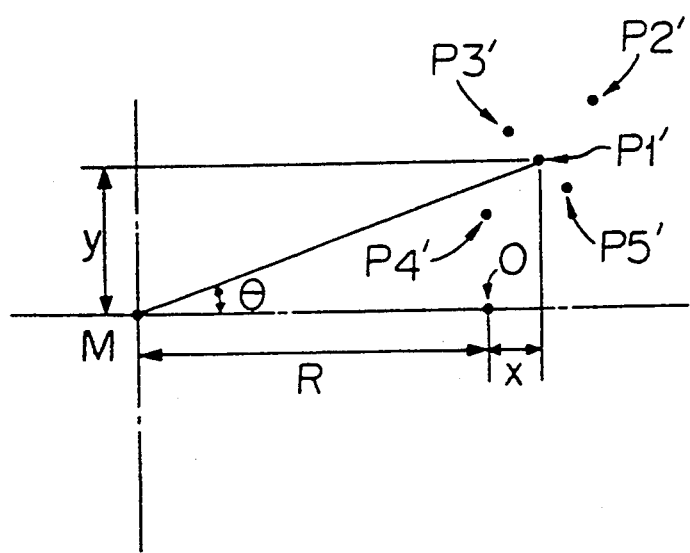
FIG. 6 is an explanatory diagram showing another example of the state wherein the luminous flux on the plane orthogonal the optical path including focus O diverges, when the lens to be inspected is provided.

Furthermore, when the lens to be inspected 10 is provided with a prism quantity, as shown in FIG. 6 as an example, the beams projected on the five points on the lens to be inspected 10 respectively correspondent to positions wherein the first through the fifth photoelectric converting elements 22, 24, 26, 28 and 30 of the beam receiving element 14, are displaced to the respective points of P1', P2', P3', P4' and P5' from the focus O, as a whole, in accordance with the prism quantity of the lens to be inspected 10, on the plane orthogonal to the optical path including the focus O.

Accordingly, by measuring the displacement quantities and the displacement directions of these five points P1', P2', P3', P4' and P5' (or, P1, P2, P3, P4 and P5) from the focus O on the plane orthogonal to the optical path including the focus O wherein the rotating plate 32 is provided, the refracting power and the prism quantity of the lens to be inspected 10 can be provided from these values.

At this point, the displacement quantities and the displacement directions of these five points P1', P2', P3', P4' and P5' (or, P1, P2, P3, P4 and P5) from the focus O can be measured based on the change quantities of the rotational angles from a predetermined reference position on the rotating plate 32, when the edge portions 36 and 38 of the window 34 provided on the rotating plate 32, pass through the respective points P1', P2', P3', P4' and P5' (or, P1, P2, P3, P4 and P5), in case wherein the rotating plate 32 is rotated by a constant angular velocity.

An explanation will be given of a mechanism and a method for providing the displacement quantities and the displacement directions of the five points P1', P2', P3', P4' and P5' from the focus O, from the change quantities of the rotational angles of the rotating plate 32.

First, slits 40a and 40b for detecting positions are provided on the rotating plate 32 for determining reference rotational positions at its outer peripheral portion, as shown in FIG. 3. Particularly in this embodiment, to promote the measurement accuracy, the first slits 40a are provided respectively at positions corresponding to the front edges 36 in the respective windows 34 of the rotating plate 30, and the second slits 40b are provided respectively at positions corresponding to the rear edges 38 of the respective windows 34. The first slits 40a and the second slits 40b are formed with different peripheral lengths, which can separately be recognized.

As shown in FIG. 1, a rotational position detecting sensor 42 is provided at a position corresponding to a locus of rotation of the slits 40a and 40b for detecting a position, which is provided with a beam source for detecting the rotational position and a beam receiving element on the both sides thereof interposing the rotating plate 32. Reference rotational position signals of the rotating plate 32 are outputted by detecting the first and the second slits 40a and 40b by the rotational position detecting sensor 42.

Figure 7:
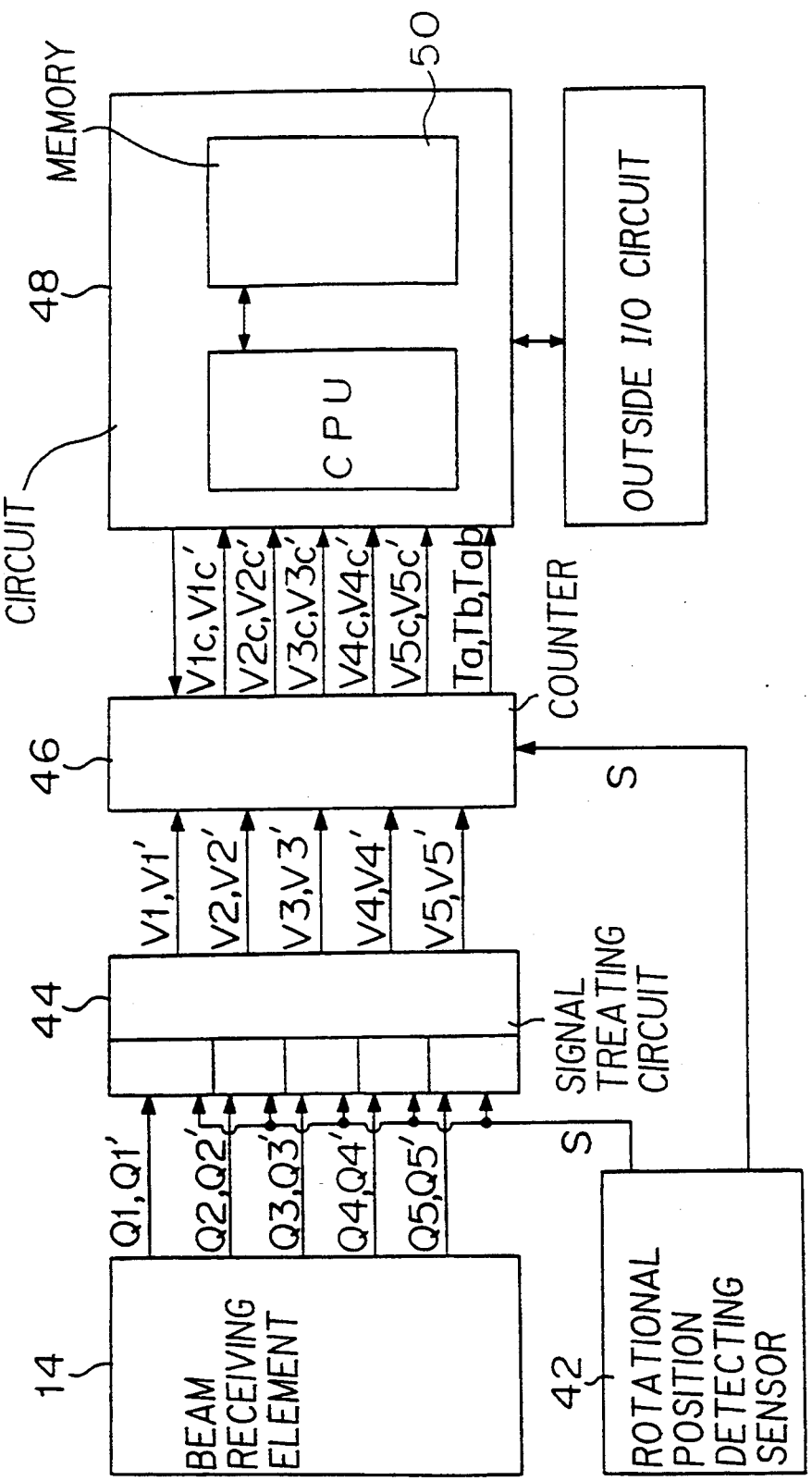
FIG. 7 is a block diagram showing a treating system of the apparatus for measuring a refracting power shown in FIG. 1.

Furthermore, as shown in FIG. 7, an output signal S from the rotational position detecting sensor 42 and output signals Q1, Q2, Q3, Q4 and Q5 from the first through the fifth photoelectric converting elements 22, 24, 26, 28 and 30 of the beam receiving elements 14, that is, Q1, Q2, Q3, Q4 and Q5, are inputted to a signal treating circuit 44. Treating signals V1, V2, V3, V4 and V5 including position signals of the five points P1', P2', P3', P4' and P5' on the plane orthogonal to the optical path including the focus O wherein the rotating plate 32 is provided, are outputted from the signal treating circuit 44.

Figure 8:
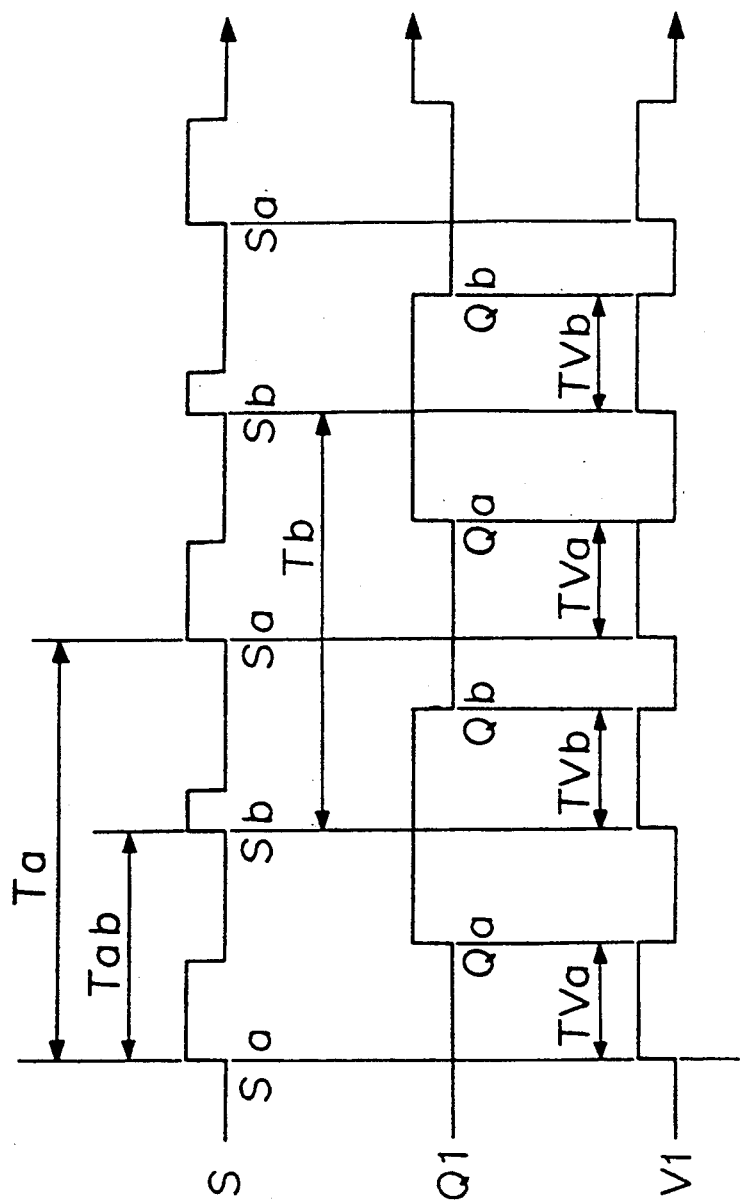
FIG. 8 is a diagram showing respectively output signals from a rotational position detecting sensor and a beam receiving element under a state wherein a lens to be inspected is not provided in the apparatus for measuring a refracting power in FIG. 1, and an example of a treating signal provided from the output signals with time on the ordinate.

Specifically, considering the state wherein the lens to be inspected 10 is not provided, signals shown in FIG. 8 are respectively provided as an output signal S from the rotational position detecting sensor 42 and an output signal Q1 from the first photoelectric converting element 22 in the beam receiving element 14. FIG. 8 shows the respective output signals with time on the ordinate. In FIG. 8, on the output signal S of the rotational position detective sensor 42, Sa and Sb respectively designate rise points of the beams transmitted through the first slits 40a and the second slits 40b. On the output signal Q1 of the beam receiving element 14, Qa and Qb respectively designate an incident position and a blocking position of the luminous flux with respect to the first photoelectric converting element, an interval between Qa and Qb, an incident state, and an interval between Qb and Qa, a blocking state.

These output signals S and Q1 are inputted into the signal treating circuit 44. In the signal treating circuit 44, a time difference TVa between the rise point Sa of the beam transmitted through the first slit 40a on the output signal S of the rotational position detecting sensor 42, and the incident position Qa of the luminous flux on the output signal Q1 of the beam receiving element 14, is calculated. Furthermore, a time difference TVb between the rise point Sb of the beam transmitted through the second slit 40b on the output signal S of the rotational position detecting sensor 42, and the blocking position Qb of the luminous flux of the output signal Q1 of the beam receiving element 14, is calculated. The treating signal V1 is outputted as a signal including these time differences TVa and TVb.

Furthermore, this treating signal V1 is inputted into a counter 46 (refer to FIG. 7). In the counter 46, by counting treating signal V1 in accordance with a clock number inputted from a CPU, the treating signal V1 is converted into a data V1c which is a counted value thereof, and transmitted to a calculation treatment circuit 48.

On the other hand, when the lens to be inspected 10 is provided on the optical path, as shown in FIG. 6, since a passing point P1' of the luminous flux incident on the first photoelectric converting element 22 on the plane orthogonal to the optical path including the focus O wherein the rotating plate 32 is provided, changes, compared with the state wherein the lens to be inspected 10 is not provided (refer to FIG. 5), the rotational angle of the rotating plate 32 is changed by $\theta$ when the luminous flux is intermittently blocked.

Figure 9:
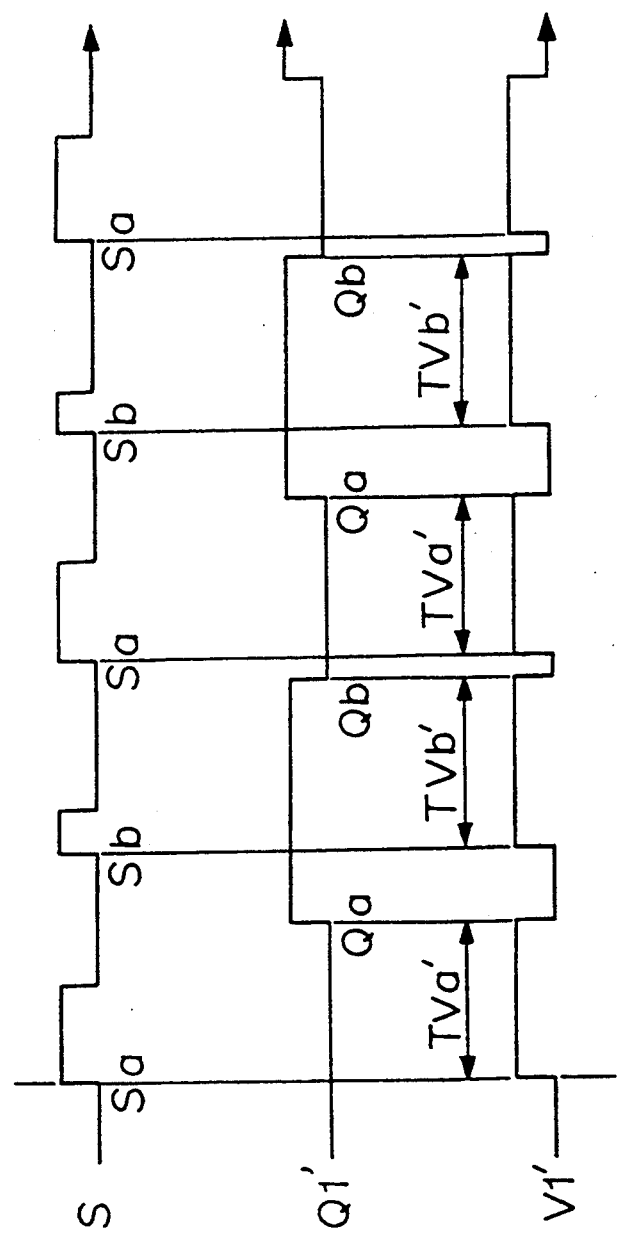
FIG. 9 is a diagram showing respectively output signals from the rotational position detecting sensor and the beam receiving element when the lens to be inspected is provided in the apparatus for measuring the refracting power in FIG. 1, and an example of a treating signal provided from the output signals, with time on the ordinate.

Accordingly, for instance, a signal as shown in FIG. 9 is provided as an output signal Q1' from the first photoelectric converting element 22 of the beam receiving element 14. Furthermore, in FIG. 9, the output signal S from the rotational position detecting signal sensor 42 is naturally not changed by providing the lens to be inspected 10.

The output signal S from the rotational position detecting sensor 42 and the output signal Q1' from the beam receiving element 14, are inputted into the signal treating circuit 44 as in the case wherein the lens to be inspected 10 is not provided and converted into a treating signal V1' by the same treatment, and further to a data V1c' by inputting V1' to the counter 46 and converting into a counted value, which is transmitted to the calculation treating circuit 48.

Figure 10:
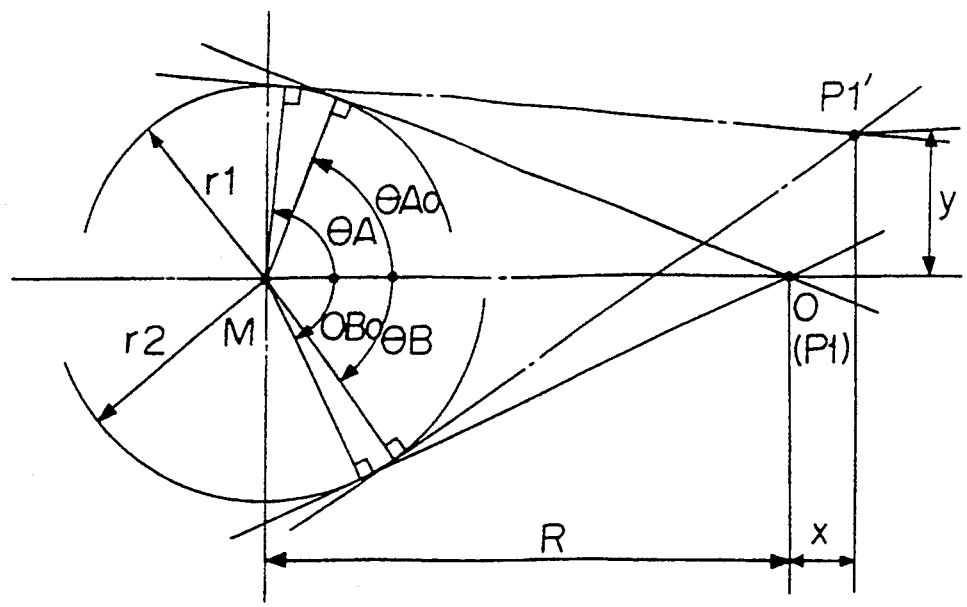
FIG. 10 is an explanatory diagram for explaining a relationship between a displacement quantity of a luminous flux on a plane orthogonal to an optical path including the focus O, when the lens to be inspected is provided in the apparatus for measuring a refracting power in FIG. 1; and a change quantity of a rotational angle of a rotating plate.

Accordingly, in the calculation treating circuit 48, by multiplying the inputted data V1c and V1c' (TVa, TVb and TVa', TVb') with a constant magnification factor of (counted value to rotational angle), as shown in an outline explanatory diagram of FIG. 10, the rotational angles $\theta A_0$ and $\theta B_0$ when the front edge 36 and rear edge 38 of the window 34 of the rotating plate 32 pass through the reference point O, and the rotational angles $\theta A$ and $\theta B$ when the front edge 36 and rear edge 38 pass through the passing point P1' of the luminous flux which are displaced by the lens to be inspected 10, are respectively provided.

Furthermore, the rotational angles $\theta A_0$, $\theta B_0$, $\theta A$ and $\theta B$ of the rotating plate 32 are values which are provided with respect to the rotational positions (Sa and Sb on S which are the output signals from the rotational position detecting sensor 42, in FIGS. 8 and 9) corresponding to the first and the second slits 40a and 40b of the rotating plate 32 as references, which are converted into the rotational angles with respect to a reference position of the rotational angle (X-axis direction in FIG. 10).

Then, four following equations (1), (2), (3) and (4) are established from the rotational angles $\theta A_0$, $\theta B_0$, $\theta A$ and $\theta B$ of the rotating plate 32 obtained as above, by a theorem of geometry.

$$r1 = R \cdot \cos \theta A_0 \tag{1}$$

$$r2 = R \cdot \cos \theta B_0 \tag{2}$$

$$(R+x)\cdot\cos \theta A + y\cdot\sin \theta A = r1 \tag{3}$$

$$(R+x)\cdot\cos \theta B + y\cdot\sin \theta B = r2 \tag{4},$$

where R is the distance between the center of rotation M of the rotating plate 32 and the reference point O, r1 is, a radius of a locus of an intersection point made by an extension line of the front edge 36 of the window 34 of the rotating plate 32, and a line passing through the center of rotation M of the rotating plate 32 and perpendicular to the extension line, r2 is, a radius of a locus of an intersection point made by an extension line from the rear edge 38 of the window 34 of the rotating plate 32 and a line passing through the center of the rotation M of the rotating plate 32 and perpendicular to the extension line.

Furthermore following equations (5) and (6) are established from the above equations (3) and (4).

$$x = (r2 \cdot \sin\theta A - r1 \cdot \sin \theta B)/\sin(\theta A - \sin\theta B) - R \tag{5}$$

$$y = (r1 \cdot \cos\theta B - r2 \cdot \cos \theta A)/\sin(\theta A - \sin\theta B) \tag{6}$$

Accordingly, from these equations (5) and (6), the displacement quantity and the displacement direction of the passing point of the luminous flux P1' on the plane orthogonal to the optical path including the focus O wherein the rotating plate 32 is provided, from the focus O, can be calculated.

By applying the above treatment to passing points of the other luminous fluxes P2', P3', P4' and P5' on the optical path on which the rotating plate 32 is provided, the displacement quantities and the displacement directions of these points from the focus O can be similarly calculated.

In this embodiment, the rotating plate 32 is disposed at the focus O. In the state wherein the lens to be inspected FIG. 10 is not provided, the output signals Q1, Q2, Q3, Q4 and Q5 at the respective photoelectric converting elements 22, 24, 26, 28 and 30 of the beam receiving element 14 share the same value. When the rotational velocity of the rotating plate 30 is known, TVa and TVb can be calculated. Therefore, TVa and TVb may be provided at the calculation treating circuit 48, based on the output signal S from the rotational position detecting sensor 42.

In this way, the refracting power and the prism quantity of the lens to be inspected 10 can be provided from the positions of the respective points P1', P2', P3', P4' and P5' obtained as above, on the plane orthogonal to the optical path including the focus O wherein the rotating plate 32 is provided.

The coordinate values x and y of the respective points P1', P2', P3', P4' and P5' on the plane orthogonal to the optical path including the focus O wherein the rotating plate 32 is provided, are defined as follows.

P1' = (x1, y1)
P2' = (x2, y2)
P3' = (x3, y3)
P4' = (x4, y4)
P5' = (x5, y5)

Then, the following equations (7) through (12) are established from Prentice's formula of the glass optics.

$$D1 = (x2 - x3 - x4 + x5)/4 \tag{7}$$

$$D2 = (x2 + x3 - x4 - x5)/4 \tag{8}$$

$$D3 = (y2 - y3 - y4 + y5)/4 \tag{9}$$

$$D4 = (y2 + y3 - y4 - y5)/4 \tag{10}$$

$$Hx = (x2 + x3 + x4 + x5)/4 = x1 \tag{11}$$

$$Hy = (y2 + y3 + y4 + y5)/4 = y1 \tag{12},$$

where Hx and Hy are eccentricities or the prism quantities. D1 through D4 are quantities given by the following equations (13) through (16), from the spherical refracting power S, the cylindrical refracting power C and an angle of cylindrical axis A of the lens to be inspected.

$$D1 = S + C \cdot \sin^2 A \tag{13}$$

$$D2 = -C \cdot \sin A \cdot \cos A \tag{14}$$

$$D3 = -C \cdot \sin A \cdot \cos A \tag{15}$$

$$D4 = S + C \cdot \cos^2 A \tag{16}$$

Accordingly, the refracting power of the lens to be inspected can be calculated by the following equations (17), (18) and (19).

$$S = (D_1 + D_4 - C)/2 \tag{17}$$

$$C = \{(D_1 - D_4)^2 + (D_2 + D_3)^2\}^{\frac{1}{2}} \tag{18}$$

$$A = [\tan^{-1}\{(D_2 + D_3)/(D_1 - D_4)\}]/2 \tag{19}$$

Therefore, in the above apparatus for measuring the refracting power and the prism quantity of the lens to be inspected 10 can be provided from the positions (coordinate values) of the respective points P1', P2', P3', P4' and P5' respectively corresponding to the disposed locations of the first through the fifth photoelectric converting elements 22, 24, 26, 28 and 30 on the plane orthogonal to the optical path including the focus O, which are obtained by comparing the output signals of the first through the fifth photoelectric converting elements 22, 24, 26, 28 and 30 of the beam receiving element 14, respectively with the output signals of the rotational position detecting sensor 42. Therefore, it is not necessary to dispose the first through the fifth photoelectric converting elements 22, 24, 26, 28 and 30 in pairs on the beam receiving space. Furthermore, it is not necessary to correspond the disposed locations to the edge portions 36 and 38 of the window 34 provided in the rotating plate 32.

Therefore, in this apparatus for measuring a refracting power, the disposed positions of the first through the fifth photoelectric converting elements 22, 24, 26, 28 and 30 of the beam receiving element 14, and the shape of the window 34 of the rotating plate 32 can be designed independently with each other, by which the degree of freedom of design of the device can preferably be provided.

Furthermore, in this apparatus for measuring the refracting power, the positions (coordinate value) of the respective points P1', P2', P3', P4' and P5' on the plane orthogonal to the optical path including the focus O, can be calculated from the rotational angles of the rotating plate .32 when the edge portions 36 and 38 of the window 34 provided on the rotating plate 32, pass through the respective points. Accordingly, the measurement of the refracting power with extremely high accuracy can be provided, so far as the shapes of the edge portions 36 and 38 of the window 34 are mathematically known.

Figure 11:
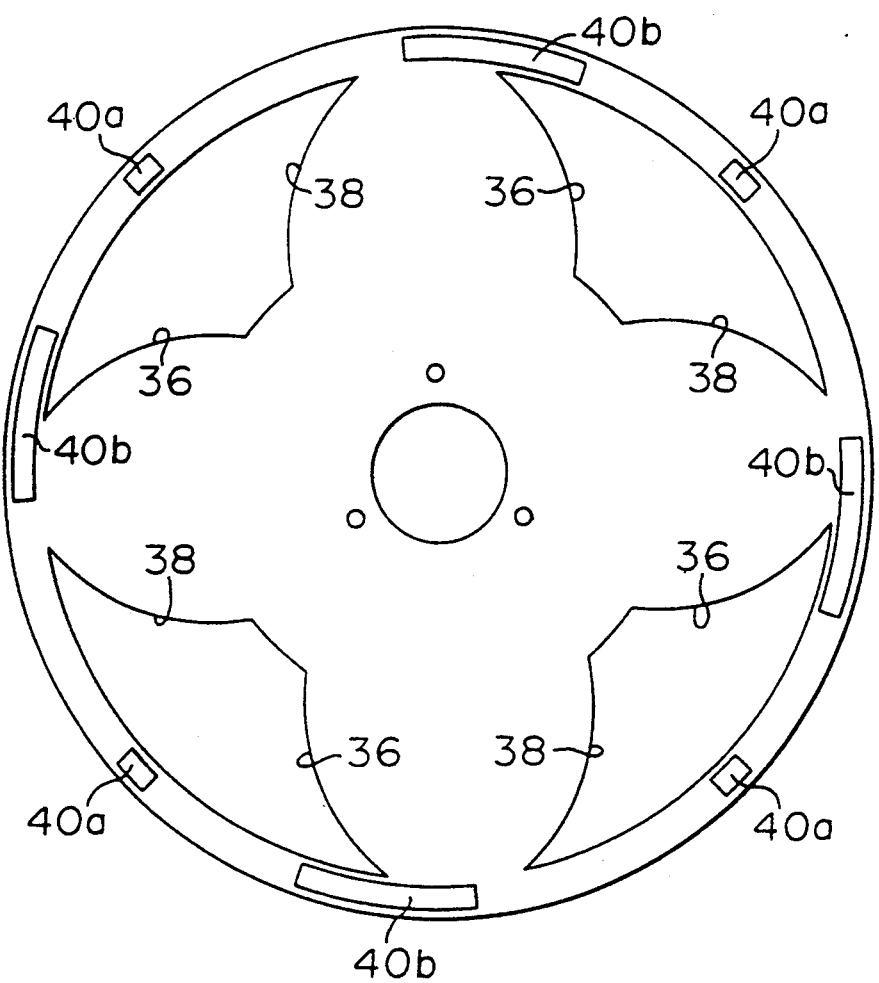
FIG. 11 is a front diagram showing a rotating plate other than the rotating plate shown in FIG. 1 capable of being employed in the apparatus for measuring a refracting power shown in FIG. 1.

Furthermore, as is clarified as above, the edge portions 36 and 38 of the window 34 of the rotating plate 32 are not necessarily linear, so far as the shapes thereof are mathematically known. For instance, as shown in FIG. 11, a rotating plate provided with the window 34 having the edge portions 36 and 38 of a curved shape (arcuate shape in this example), can be adopted.

Furthermore, according to this apparatus for measuring a refracting power, the positions (coordinate values) of the respective points P1', P2', P3', P4' and P5' respectively corresponding to the disposed locations of the first through the fifth photoelectric converting elements 22, 24, 26, 28 and 30 on the plane orthogonal to the optical path including the focus O, can be provided independently with each other. The refracting power and prism quantity of the lens to be inspected 10 can be provided from the displacement quantities of the respective points. Accordingly, by pertinently determining the disposing style and the disposing number of the photoelectric converting elements, the measurement accuracy of the apparatus or the like can pertinently be determined in an extremely wide range. In this way, it is possible to achieve the function in correspondence with requirements of a simple apparatus for measuring a refracting power for a lens having a comparatively simple refracting power as well as an apparatus for measuring a refracting power having high accuracy which can be employed in a lens having a complicated refracting power.

Especially, in this apparatus for measuring a refraction power, it is possible to measure the prism quantity or the refracting power of the multi-foci lens or the like, which has been extremely difficult in the conventional device wherein the refraction power of the lens to be inspected is provided from the phase difference of the outputs of the paired photoelectric converting elements, by pertinently determining the disposing number and the disposing locations of the photoelectric converting elements.

Furthermore, in this apparatus for measuring the refracting power, the output signal in correspondence with the rotational velocity of the rotating plate 32 can always be provided by the rotational position detecting sensor 42. Therefore, it is possible to easily correct the measured signal in accordance with the change of the rotational velocity, by monitoring the rotational velocity of the rotating plate 32 based on the output signals, by which lowering of the measurement accuracy by the variation of the rotational velocity of the rotating plate.32, can preferably be alleviated or prevented.

Specifically, in the above embodiment, the reference time $Ta$ between the rise points Sa by the first slit 40a on the output signal S from the rotational position detecting sensor 42, the reference time $Tb$ ($Ta=Tb$ in this embodiment) between the rise points Sb by the second slit 40b, and the reference time Tab between the rise points Sa by the first and the second slit 40a and 40b, are determined and memorized in a memory 50 (refer to FIG. 8). Furthermore, as shown in FIG. 7, the actually measured output signal S in measuring the refraction power of the lens to be inspected 10, is inputted to the counter 46, the actually measured time $Ta'$ between the rise points Sa on the output signal S, the actually measured time $Tb'$ between the rise points of Sb and the actually measured time $Tab'$ between the rise points of Sa and Sb, are inputted into the calculation treating circuit 48 as clock numbers. In the calculation treating circuit 48, by ratios of the actually measured times $Ta'$, $Tb'$ and $Tab'$ as compared to the reference times $Ta$, $Tb$ and $Tab$, a correction coefficient is determined. The correction of the nonuniformity of rotation of the rotating plate 32 can be performed by multiplying the data $V1c'$ through $V5c'$ inputted from the counter 46 with the correction coefficient.

Furthermore, especially in this example, since the first slit 40a and the second slit 40b are provided respectively corresponding to the front edge 36 and the rear edge 38 of the respective window 34 provided on the rotating plate 32, it is possible to correct the nonuniformity of the rotation at every interval between the respective edges.

Furthermore, especially in this embodiment, the opening positions of the first slit 40a and the second slit 40b on the front sides thereof in the rotational direction, are located spaced apart from each other by approximately the same distance in the peripheral direction, with respect to the front edge 36 and the rear edge 38 of the window 34. Therefore, the time difference TVa and TVb (refer to FIG. 8) on the treating signal V obtained from the output signal S of the rotational position detecting sensor 42 and the output signal Q of the beam receiving element 14, are approximately the same. Therefore, as mentioned above, by performing the correction of the nonuniformity of rotation of the rotating plate 32, wherein the correction coefficient which is determined by the ratios of the actually measured time $Ta'$, $Tb'$ and $Tab'$ as compared to the reference times $Ta$, $Tb$ and $Tab$, is multiplied to the data $V1c'$ through $V5c'$, the valuation of the correction quantity due to the difference between the sizes (counter values) of the respective data, can preferably be reduced, which enables the effective correction.

Since the correction of the nonuniformity of rotation of the rotating plate 32 is made possible by the above method, it is not necessary to employ a motor having high function as a driving means of the rotating plate 32. Therefore, the reduction of the fabrication cost of the apparatus can preferably be achieved while sufficiently maintaining the measurement accuracy.

The detailed description has been provided for the embodiments of the present invention as above. However, these are only literal examples. This invention should not be interpreted as being limited to these specific examples.

For instance, in the above embodiment, the four windows 34 having the same shape is provided to the rotating plate 32. However, the shapes of the window 34 are not required to be the same as each other.

The window of the rotating plate is applicable to this invention so far as the window forms the boundary lines which are detectable by the photoelectric converting element by intermittently blocking the luminous flux. For instance, it is possible to intermittently block the luminous flux by two or more domains composed of materials mutually different with respect to the light transmittances.

Furthermore, the domains for intermittently blocking luminous flux is not necessarily a window. It is possible to form the domain by a protruding portion which protrudes outwardly, wherein at least two edge portions having mutually different angles of inclination with respect to the rotational direction, are formed in the peripheral direction.

The first slits 40a and the second slits 40b are provided in four, respectively corresponding to the front edge 36 and the rear edge 38 in the window 34 of the rotating plate 32. However, it is possible to specify the locations of the edge portions 36 and 38 of the respective windows 34 with a reference of a single slit, and at least one slit may be provided.

The number of the beam receiving points of the beam receiving element may be at least three, which may pertinently be determined in accordance with the kind of lens to be inspected as an object, the required accuracy or the like.

Furthermore, in this invention, it is not always necessary to correct the nonuniformity of rotation of the rotating plate. It is possible to perform the correction of the nonuniformity of rotation of the rotating plate, at every one rotation of the rotating plate.

Furthermore, in the above embodiments, the rotating plate 32 is disposed on the focus O of the condensing lens 18. However, the rotating plate 32 may be disposed on the optical path wherein the optical path is changed by the refraction power of the lens to be inspected 10, specifically, between the lens to be inspected 10 and the beam receiving element 14. When the disposed location of the rotating plate 32 is not on the focus O of the condensing lens 18, the reference point or the reference rotational position of the rotating plate 32 should previously be determined for the respective photoelectric converting elements of the beam receiving element 14.

Although not enumerating, this invention can be performed in embodiments added with various alterations, modifications, improvements and the like, based on the knowledge of the artisan. So far as these embodiments do not deviate from the gist of the present invention, these embodiments are naturally incorporated in the scope of the present invention.

As is clarified by the above description, according to the present invention, it is not necessary to correspond the angle of inclination of the boundary line (edge portion) for intermittently blocking the luminous flux in the rotating plate to the beam receiving point of the beam receiving element. Accordingly, the shape of the boundary line of the rotating plate and the beam receiving point of the beam receiving element can be designed independently with each other, and the degree of freedom of design in the apparatus for measuring the refraction power can preferably be provided.

Furthermore, in this invention, since the measurement accuracy can sufficiently be provided so far as the shape of the boundary line for intermittently blocking the luminous flux in the rotating plate, is mathematically known, it is not necessary to form the boundary line in a particularly complicated shape, and therefore, the fabrication thereof is facilitated.

Furthermore, in this invention, basically, the displacement quantity of the luminous flux which has passed through the lens to be inspected, can be provided as the change quantity of the rotational angle from the predetermined reference position in the rotating plate, at a plurality of points corresponding to the respective beam receiving points of the beam receiving element.

Therefore, the refracting powers at the respective points of the lens to be inspected corresponding to the plurality of points can be provided independently with each other. Accordingly, compared with the conventional device wherein the refracting power of the lens to be inspected is provided by the phase difference of the output of the paired photoelectric converting elements, the measurement accuracy can easily and preferably be provided. The measurement of the prism quantity and the measurement of the refracting power of the multi-foci lens or the like which are difficult in the conventional apparatus, are made possible by pertinently determining the disposing number and the disposing locations of the beam receiving points of the beam receiving element.

Furthermore, in this invention, the nonuniformity of the rotational velocity of the rotating plate can easily be detected and the correction can easily be performed by the position detecting means for detecting the rotational position of the rotating plate.

We claim:

1. A method for measuring a refracting power of an optical system to be inspected, comprising the steps of:

projecting a luminous flux to a beam receiving element for measurement;

intermittently blocking the luminous flux by rotating a rotating plate formed with at least two domains having different light transmittances partitioned by boundary lines having at least two kinds of angles of inclination with respect to a rotational direction around an axis of an optical path between the optical system to be inspected and the beam receiving element for measurement, wherein the optical system to be inspected is to be inserted between a beam source and the rotating plate;

detecting the luminous flux transmitted through the optical system to be inspected and intermittently blocked by the rotating plate at the beam receiving element for measurement, and outputting a first luminous flux reception signal based on the detected luminous flux when the optical system to be inspected is not inserted between the beam source and the rotating plate and outputting a second luminous flux reception signal based on the detected luminous flux when the optical system to be inspected is placed between the beam source and the rotating plate;

detecting a rotational position of the rotating plate, and outputting a rotational detection signal based on the detected rotation of the rotating plate; and calculating a refracting power of the optical system to be inspected based on a change quantity from the detected rotational detection signal to the first detected luminous flux reception signal and from the detected rotational plate detection signal to the second detected luminous flux reception signal.

2. An apparatus for measuring a refractive power of an optical system to be inspected, comprising:

a beam source for generating a beam;

a rotating plate for intermittently blocking the beam, wherein the optical system to be inspected is to be inserted between the beam source and the rotating plate;

a beam receiving element for receiving the beam intermittently blocked by the rotating plate, and outputting a first beam reception signal based on the received beam when the optical system to be inspected is not inserted between the beam source and the rotating plate and outputting a second beam reception signal based on the received beam when the optical system to be inspected is placed between the beam source and the rotating plate;

a rotational position detector for detecting a rotational position of the rotating plate, and outputting a rotational plate detection signal based on the detected rotational position of the rotating plate; and calculating means for calculating the refracting power of the optical system to be inspected based on a change quantity from the detected rotational plate detection signal to the first detected beam reception signal and from the detected rotational plate detection signal to the second detected beam reception signal.

3. The apparatus according to claim 2, wherein the rotating plate comprises at least two domains having different light transmittances partitioned by boundary lines.

4. The apparatus according to claim 2, wherein the rotating plate comprises at least one slit which is detected by the rotational position detector for detecting the rotational position of the rotating plate.

5. The apparatus according to claim 3, wherein the rotating plate further comprises at least one slit which is detected by the rotational position detector for detecting the rotational position of the rotating plate.

6. The apparatus according to claim 2, wherein the beam receiving element comprises a plurality of beam receiving points.

7. The apparatus according to claim 3, wherein the beam receiving element comprises a plurality of beam receiving points.

8. The apparatus according to claim 4, wherein the beam receiving element comprises a plurality of beam receiving points.

9. The apparatus according to claim 5, wherein the beam receiving element comprises a plurality of beam receiving points.

10. The apparatus according to claim 6, further comprises a beam projecting system located between the beam source and optical system to be inspected for projecting the beam through the optical system to be inspected.

11. The apparatus according to claim 6, further comprising a beam condensing system located between the optical system to be inspected and rotating plate for focussing the beam passing through the optical system to be inspected onto the rotating plate.

12. The apparatus according to claim 6, further comprising an image forming optical system located between the rotating plate and beam receiving element for forming the beam intermittently blocked by the rotating plate onto the beam receiving element.

* * * * *